(12) United States Patent
Batta

(10) Patent No.: US 7,869,438 B2
(45) Date of Patent: Jan. 11, 2011

(54) PRE-AUTHENTICATION ACROSS AN 802.11 LAYER-3 IP NETWORK

(75) Inventor: Puneet Batta, Santa Clara, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 547 days.

(21) Appl. No.: 11/515,119

(22) Filed: Aug. 31, 2006

(65) Prior Publication Data

US 2008/0056272 A1 Mar. 6, 2008

(51) Int. Cl.
*H04L 12/28* (2006.01)
*H04L 12/56* (2006.01)
(52) U.S. Cl. ............. 370/395.5; 370/216; 370/248
(58) Field of Classification Search ......... 370/395, 370/331
See application file for complete search history.

(56) References Cited

U.S. PATENT DOCUMENTS

| | | | | |
|---|---|---|---|---|
| 5,835,725 | A * | 11/1998 | Chiang et al. | 709/228 |
| 6,614,781 | B1 * | 9/2003 | Elliott et al. | 370/352 |
| 7,477,747 | B2 * | 1/2009 | Stieglitz et al. | 380/270 |
| 2003/0103525 | A1 * | 6/2003 | Wahl | 370/465 |
| 2003/0169713 | A1 * | 9/2003 | Luo | 370/338 |
| 2005/0163078 | A1 * | 7/2005 | Oba et al. | 370/331 |
| 2005/0243769 | A1 * | 11/2005 | Walker et al. | 370/331 |
| 2007/0008926 | A1 * | 1/2007 | Oba | 370/331 |

FOREIGN PATENT DOCUMENTS

WO 2005109771 A 11/2005

OTHER PUBLICATIONS

IEEE Standard for Information technology—Part 11: Wireless LAN Medium Access Control (MAC) and Physical Layer (PHY) Specifications ANSI/IEEE Std 802.11, 1999 Edition.*
IETF RFC 3378 EtherIP: Tunneling Ethernet Frames in IP Datagrams Housley and Hollenbeck Sep. 2002.*
IETF RFC 2865 Remote Authentication Dial in User Service (RADIUS) Jun. 2000 Rigney et al.*
IEEE Standard 802.11, 1999 Edition (R2003) Part 11: Wireless LAN Medium Access Control (MAC) and Physical Layer (PHY) Specifications Published Aug. 20, 1999 Reaffirmed Jun. 12, 2003.*
IEEE Std 802.11i-2004 Part 11: Wireless LAN Medium Access Control (MAC) and Physical Layer (PHY) specifications Amendment 6: Medium Access Control (MAC) Security Enhancements Jul. 23, 2004.*
ANSI/IEEE Std 802.11, 1999 Edition (R2003) Part 11: Wireless LAN Medium Access Control (MAC) and Physical Layer (PHY) Specifications Reaffirmed Jun. 12, 2003.*
IEEE Std 802.1X-2004 Port-Based Network Access Control Dec. 13, 2004.*
International Search Report for International Application No. PCT/US2007/076653, mailed Feb. 1, 2008.

* cited by examiner

*Primary Examiner*—Daniel Wu
*Assistant Examiner*—Frederick Ott
(74) *Attorney, Agent, or Firm*—Ingrassia, Fisher & Lorenz, P.C.

(57) ABSTRACT

A method for pre-authentication in a wireless network is disclosed. The method begins by receiving, from a mobile client device, an Ethernet pre-authentication frame having an Ethernet address corresponding to a destination infrastructure device in the wireless network. Based upon a network mapping table, the method determines an internet protocol (IP) address that is mapped to the Ethernet address of the destination infrastructure device. The Ethernet pre-authentication frame is encapsulated inside an IP packet having the IP address. Then, the method routes the IP packet to the destination infrastructure device across WLANs with a different VLAN or subnetwork boundary in the wireless network.

16 Claims, 4 Drawing Sheets

US 7,869,438 B2

PRE-AUTHENTICATION ACROSS AN 802.11 LAYER-3 IP NETWORK

TECHNICAL FIELD

The present invention relates generally to roaming among cells in a wireless network. More particularly, embodiments of the present invention relate to pre-authentication in wireless local area networks.

BACKGROUND

A wireless local area network ("WLAN") relies on infrastructure components to establish associations such as data communication links with mobile client devices. A mobile client device communicates, via a wireless data communication channel, with an access point device, which in turn communicates with other network components via traditional wired interfaces or via wireless interfaces. A WLAN infrastructure may be configured to support a plurality of mobile clients using a single access point device. In other words, one access point device can support a plurality of different groups or categories of client devices, each having a wide range of possible data rate or bandwidth requirements.

In WLAN systems, the term "handoff" refers to the process of transferring an ongoing mobile client device data session from one WLAN connection to another. Two example cases where a handoff might be conducted are: (1) if a mobile client device has moved out of the range of one access point and can get a better radio link from another access point; and (2) if one access point has limited or no additional bandwidth, the connection can be transferred to another access point. The most basic form of handoff is where a connection in progress is redirected from one access point to another access point without interrupting the connection. The mobile client device can be connected to only one access point at a time and drops the radio link for a brief period of time before connecting to a different access point. This is referred to as a "hard handoff," and, referring to the radio link, is described as "break before make." In some systems the mobile client device can be connected to several access points simultaneously, combining the signaling from nearby transmitters into one signal. The radio link with the previous access point is not broken before a link is established with a new sector, so this type of handoff is described as "make before break."

A WLAN can give mobile clients the ability to "roam" or physically move from place to place without being connected by wires. In the context of a WLAN, the term "roaming" describes the act of moving between wireless access devices, which may be stand-alone wireless access points that cooperate with WLAN infrastructure. Many deployments of wireless computer infrastructure, such as WLANs, involve the use of multiple wireless access devices serving a number of mobile client devices.

Access control is used to insure a WLAN is used only by authorized clients, and access control techniques attempt to detect and exclude unauthorized clients. Access to a WLAN is therefore usually controlled by an authentication procedure to establish with some degree of confidence the identity of the user, then grant the privileges authorized to that user. Authentication is the process of attempting to verify the digital identity of the sender of a communication such as a request to connect. The sender being authenticated may be a mobile client device such as a laptop computer, a mobile phone, or other mobile devices. When a mobile client device roams between access points in a WLAN, the mobile client device must be re-authenticated for each new connection with an access point.

The IEEE 802.11i specification supports pre-authentication of mobile users for fast, secure roaming. To benefit security and performance, a scheme called Pairwise Master Key (PMK) Caching configures a shared key between a mobile client device and its authenticator. When a mobile client roams between access points, that mobile client's credentials no longer must be completely re-authenticated—a task that can take more than 100 milliseconds. If handoff were to take this long in the case of a voice session, for example, a connection would likely be dropped. Pre-authentication comes into play when users roam and in cases when signal strength fades and a client simply needs to find another access point with which to associate. Without pre-authentication, a mobile client roaming on a WLAN must break its connection and re-authenticate on a new WLAN before reconnecting to a new access point on the new WLAN.

In this regard, a mobile client on a WLAN may not be able to roam, with a continuous connection, to an access point on a different WLAN with a different virtual local area network ("VLAN") or subnetwork (subnet). This may cause limited mobility for a mobile client roaming between different WLANs. It is desirable to have a way to roam across WLANs with different VLAN or subnetwork boundaries. Other desirable features and characteristics of the present invention will become apparent from the subsequent detailed description and the appended claims, taken in conjunction with the accompanying drawings and the foregoing technical field and background.

BRIEF SUMMARY

Methods for pre-authentication in a wireless network are disclosed. To allow fast roaming of a mobile client device with a continuous connection the mobile client device prepares for authentication (pre-authentication) with the destination infrastructure. The technique can be performed when a mobile client device that is currently communicating with one infrastructure device on a first WLAN intends to communicate with a destination infrastructure device on a different WLAN having a different VLAN or subnetwork.

According to a first example embodiment of the invention, the method begins with a WLAN infrastructure receiving an Ethernet pre-authentication frame from a mobile client device, where the Ethernet pre-authentication frame has an Ethernet address corresponding to a destination infrastructure device in the WLAN. Based upon a network mapping, the WLAN infrastructure determines an internet protocol (IP) address that is mapped to the Ethernet address of the destination infrastructure device, and encapsulates the Ethernet pre-authentication frame inside an IP packet having the IP address. Then, the infrastructure device sends the IP packet to the destination infrastructure device in the network to pre-authenticate the mobile client device.

A method according to a second example embodiment of the invention begins by an infrastructure device receiving, from a mobile client device in the wireless network, a pre-authentication frame in accordance with a first network communication scheme, where the pre-authentication frame includes a first location identifier for a destination infrastructure device in the wireless network. The infrastructure device then maps the first location identifier to a second location identifier for the destination infrastructure device and encapsulates the pre-authentication frame inside a routing frame that is configured for compliance with a second network communication scheme. The routing frame includes the second location identifier for the destination infrastructure device. The infrastructure device then sends the routing frame to the destination infrastructure device to pre-authenticate the mobile client device.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
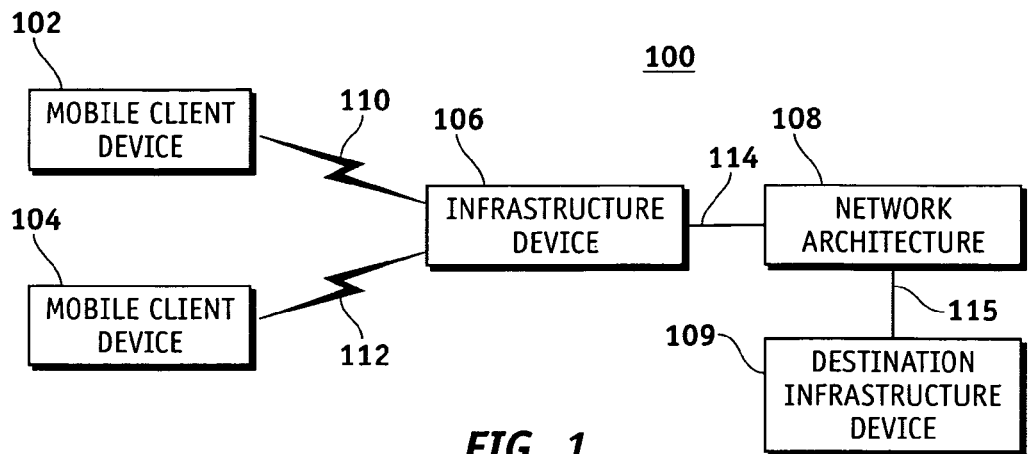
FIG. 1 is a simplified schematic representation of a typical WLAN infrastructure suitable for use in connection with an example embodiment of the invention.

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

For the sake of brevity, conventional techniques related to wireless signal processing, wireless data transmission, WLANs, signaling, network control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The detailed description may refer to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. Thus, although the figures may depict example arrangements of elements, additional intervening elements, devices, features, or components may be present in an actual embodiment (assuming that the functionality of the system is not adversely affected).

As used herein, the term "access point" means any component, device, feature, element, or function that is configured to receive/transmit wireless traffic from a wireless client device in a WLAN environment. Traditionally, an access point or an access point device refers to a hardware component that includes a radio module, memory, processing logic, and a network communication module that enables it to communicate with other network architecture components. For convenience, the term "access point" as used herein contemplates an access point device in the traditional sense, in addition to a subsystem that includes an access port device and a wireless switch. Moreover, the term "access point" contemplates any individual component, device, hardware, or system, and any combination thereof, that is configured to function in the manner described herein. For example, the pre-authentication features described herein may be implemented in an untraditional architecture that combines the necessary radio module, processing power, memory, and the like with additional features not typically found in conventional stand-alone access point devices.

In accordance with the IEEE 802.11 specification, wireless access points are typically associated with a basic service set ("BSS") and an extended service set ("ESS"). A BSS is the basic building block of an IEEE 802.11 wireless LAN. The mobile clients covered by one access point are associated with one BSS. An access point acts as a master to control the mobile clients within that BSS. A basic BSS includes of at least one mobile client and one access point. In infrastructure mode, groups of BSSs can be connected together with the use of a backbone network to form a network called an ESS. An ESS is a set of one or more interconnected BSSs and integrated local area networks (LANs) that appear as a single BSS to any mobile client associated with one of those BSSs. The set of interconnected BSSs in an ESS must have a common BSS identifier ("BSSID") and work on different channels.

In Wi-Fi Wireless LAN computer networking, a BSSID is a code attached to all packets on a wireless network to identify each packet as part of that network. In this example embodiment the code includes up to 32 alphanumeric characters. Apart from identifying each packet, a BSSID also serves to uniquely identify a group of wireless network devices used in a given BSS. Each BSS is identified by a BSSID, and all wireless devices attempting to communicate with each other share the same BSSID. WLANs are assigned a BSSID for the given infrastructure device. In practice, a BSSID is commonly set to the name of a network operator, for example, a company name.

When a mobile client device is searching for a network, it transmits a probe. An access point within range of the mobile client device will respond with a probe response. A mobile client sends a probe request when it needs to obtain information from an access point. For example, a mobile client would send a probe request to determine which access points are within range. An access point will respond with a probe response, containing capability information, supported data rates, etc., after it receives a probe request.

If the mobile client device is seeking a network connection, it sends an association request to the access point. An association response, which is sent by the access point in response to an association request, is utilized to establish the communication channel between the mobile client device and the access point. 802.11 association enables the access point to allocate resources for and synchronize with a mobile client device. A mobile client device begins the association process by sending an association request to an access point. This carries information about the mobile client device (e.g., supported data rates) and the BSSID of the network it wishes to associate with. After receiving the association request, the access point considers associating with the mobile client device, and (if accepted) reserves memory space and establishes an association ID for the mobile client device. An access point sends an association response frame containing an acceptance or rejection notice to the mobile client device requesting association. If the access point accepts the mobile client device, the response includes information regarding the association, such as association ID and supported data rates. If the outcome of the association is positive, the mobile client device can utilize the access point to communicate with other mobile client devices on the network and systems on the distribution side of the access point (e.g., Ethernet).

FIG. 1 is a simplified schematic representation of a typical WLAN infrastructure 100, including mobile client devices 102/104, an infrastructure device 106 such as an access point, a destination infrastructure device 109 such as a different access point, and a network architecture 108. As explained above, infrastructure device 106 and the destination infrastructure device 109 may each be realized as a subsystem that includes an access port device and one or more components of network architecture 108, e.g., a wireless switch. A practical WLAN infrastructure 100 may include any number of mobile client devices and any number of access points dispersed throughout the area of coverage. A mobile client device can be any computing device having a wireless transceiver and interface capabilities necessary to communicate with infrastructure device 106 via wireless links 110/112. Although not shown in FIG. 1 for clarity, WLAN infrastructure 100 may include one or more wireless switches coupled between access points and network architecture 108. Infrastructure device 106 can communicate with the network architecture 108 via any suitable data communication link 114, such as an Ethernet data cable or a wireless data communication link. Network architecture 108 may include any number of traditional computer network components, including, but not limited to: switches, routers, servers, interfaces, data storage devices, or the like. The destination infrastructure device 109 can communicate with the network architecture 108 via any suitable data communication link 115, such as an Ethernet data cable or a wireless data communication link.

Figure 2:
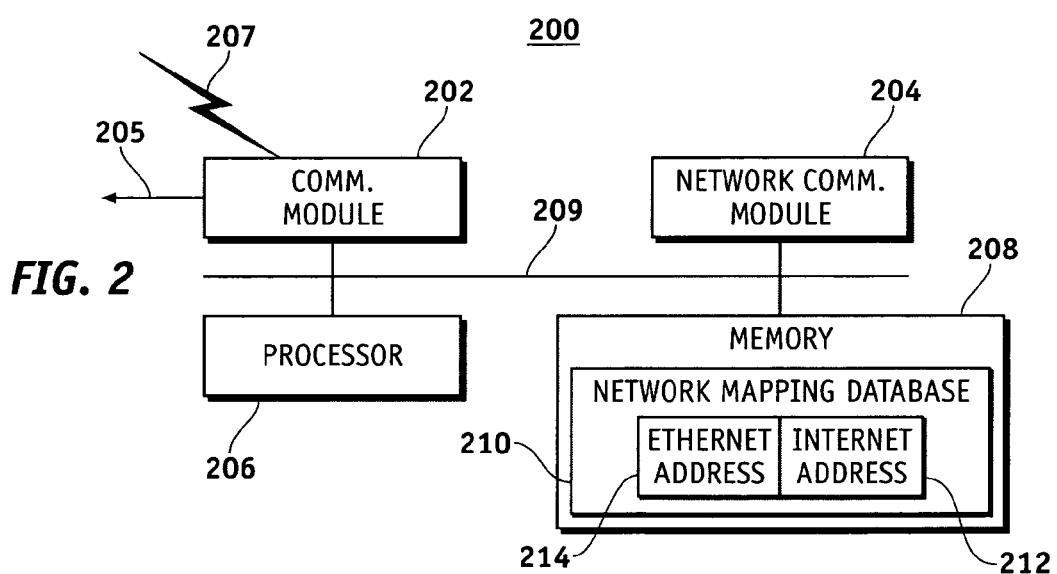
FIG. 2 is a schematic representation of an infrastructure device configured in accordance with an example embodiment of the invention.

FIG. 2 is a schematic representation of an infrastructure device 200 configured in accordance with an example embodiment of the invention. A practical embodiment of infrastructure device 200 will include additional components and elements configured to support known or conventional operating features that need not be described in detail herein. In the example embodiment, infrastructure device 200 is a wireless access point that transmits and receives data. An access point connects users to other users within the network and can also serve as the point of interconnection between a WLAN and a fixed wire network. Each access point can serve multiple users within a defined network area. As a wireless client moves beyond the range of one access point, the mobile client device can be automatically handed over to another access device, e.g., a different access point. In practice, the number of infrastructure devices in a given network generally increases with the number of network users and the physical size of the network.

Infrastructure device 200 generally includes a physical housing (not shown), a communication module 202, a network communication module 204, a processor architecture 206, and an appropriate amount of memory 208. A practical infrastructure device 200 may include any number of communication modules, any number of network communication modules, any number of processor devices, and any number of memory elements; the illustrated device depicts a simple embodiment for ease of description. These and other elements of infrastructure device 200 may be interconnected together using a data communication bus 209 or any suitable interconnection arrangement. Such interconnection facilitates communication between the various elements of wireless infrastructure device 200. Those of skill in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

Communication module 202 may be realized as a suitably configured radio communication module. Such a radio communication module, which includes a receiver and a transmitter (or a transceiver), is configured to communicate with mobile client devices via a wireless data communication link 207. A radio communication module may cooperate with a suitably configured RF antenna arrangement (not shown) that supports the particular wireless communication protocol and modulation scheme. In the example embodiment, a radio communication module is configured to support WLAN connectivity in compliance with established IEEE specifications, such as one or more of the variations of IEEE 802.11. Of course, the radio communication module may be configured to support alternate or additional wireless data communication protocols, including future variations of 802.11 such as 802.11n. Alternatively (or additionally), the communication module 202 may be suitably configured to support wired communication with the network architectures via a wired link 205. The wired link 205 may be utilized to transfer data in accordance with any suitable protocol or scheme such as, without limitation, Ethernet 802.3.

Network communication module 204 generally represents the hardware, software, firmware, processing logic, and/or other components of wireless infrastructure device 200 that enable bi-directional communication between infrastructure device 200 and network components to which wireless infrastructure device 200 is connected. For example, network communication module 204 may be configured to support 10/100 Mbps Ethernet LAN traffic. Referring to FIG. 1 as an example, network communication module 204 is suitably configured to transmit data to components in network architecture 108, and to receive data from components in network architecture 108. In a typical deployment, network communication module 204 provides an Ethernet interface such that wireless infrastructure device 200 can communicate with a conventional Ethernet-based computer network. In this regard, network communication module 204 may include a physical interface, such as 10/100/1000 Mbps interface, for connection to the computer network, and network communication module 204 (and/or processor architecture 206) may handle Ethernet addressing for data packets sent from wireless infrastructure device 200.

Processor architecture 206 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this regard, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, processor architecture 206 includes processing logic that is configured to carry out the functions, techniques, and processing tasks associated with the operation of wireless infrastructure device 200. In particular, the processing logic is configured to support the pre-authentication techniques described herein. As mentioned above, in practical embodiments the processing logic may be resident in an access point device that includes communication module 202, or in a wireless switch (which may be considered to be part of network architecture 108 that communicates with an access port device that includes communication module 202).

Figure 3:
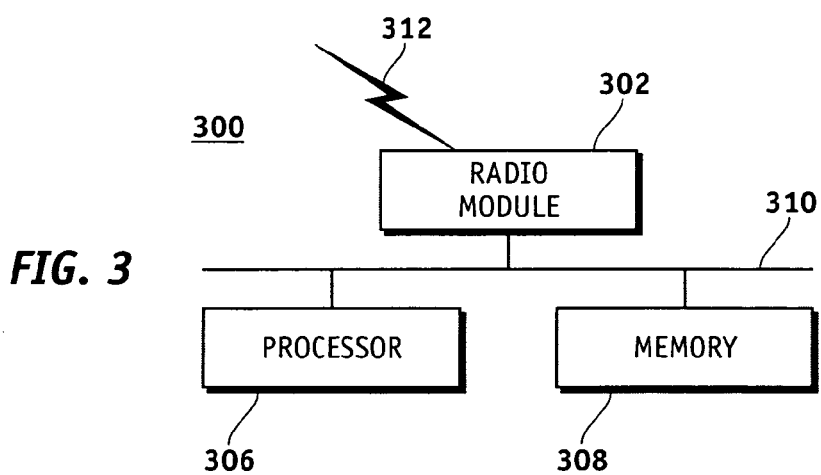
FIG. 3 is a schematic representation of a mobile client device configured in accordance with an example embodiment of the invention.

Furthermore, the steps of a method or algorithm described in connection with the embodiments disclosed herein may be embodied directly in hardware, in firmware, in a software module executed by processor architecture 206, or in any practical combination thereof. A software module may reside in memory 208, which may be realized as RAM memory, flash memory, ROM memory, EPROM memory, EEPROM memory, registers, a hard disk, a removable disk, a CD-ROM, or any other form of storage medium known in the art. In this regard, memory 208 can be coupled to processor architecture 206 such that processor architecture 206 can read information from, and write information to, memory 208. In the alternative, memory 208 may be integral to processor architecture 206. As an example, processor architecture 206 and memory 208 may reside in an ASIC. Memory 208 includes a network mapping database 210 in accordance with an example embodiment of the invention. The network mapping database 210 is configured to store, maintain, and provide data as needed to support the functionality of system 200 in the manner described below. Moreover, the network mapping database 210 may be a local network mapping database coupled to the processor architecture 206, or it may be a remote network mapping database, for example, without limitation, a central network mapping database. The network mapping database 210 is configured to maintain, without limitation, a list of Ethernet addresses 214 corresponding to infrastructure devices, and the corresponding IP addresses 212 of the destination infrastructure devices in the wireless network. In this regard, the network mapping database 210 may include a lookup table for purposes of mapping. In one embodiment, the network mapping database 210 is statistically configured. In this context, as part of the configuration of the 802.11 access point or a wireless switching device, the operator/administrator will fill in values in a table of IP addresses and corresponding Ethernet addresses. This could be over a command line interface (CLI) using: a simple network management protocol (SNMP), a graphical user interface (GUI), or any other way the device accepts configuration changes. FIG. 3 is a schematic representation of a mobile client device 300 configured in accordance with an example embodiment of the invention. A practical embodiment of mobile client device 300 will include additional components and elements configured to support known or conventional operating features that need not be described in detail herein. In the example embodiment, the mobile client device 300 transmits and receives data wirelessly to and from infrastructure devices. As the mobile client device 300 moves beyond the range of one infrastructure device, the mobile client device 300 can be automatically handed over to another infrastructure device, e.g., a candidate or destination infrastructure device. The mobile client device 300 may be, for example, without a limitation, a wireless laptop computer or a mobile phone.

Mobile client device 300 generally includes a physical housing (not shown), a radio module 302, a processor architecture 306, and an appropriate amount of memory 308. A practical mobile client device 300 may of course include any number of radio modules, any number of processor devices, and any number of memory elements; the illustrated device depicts a simple embodiment for ease of description. These and other elements of mobile client device 300 may be interconnected together using a bus 310 or any suitable interconnection arrangement. Such interconnection facilitates communication between the various elements of mobile client device 300.

Radio module 302, which includes a receiver and a transmitter (or a transceiver), is configured to communicate with infrastructure devices via a wireless data communication link 312. Radio module 302 may cooperate with a suitably configured RF antenna arrangement (not shown) that supports the particular wireless communication protocol and modulation scheme. In the example embodiment, radio module 302 is configured to support WLAN connectivity in compliance with established IEEE specifications, including the different variations of IEEE 802.11. Radio module 302 may be configured to support alternate or additional wireless data communication protocols, including future variations of 802.11 such as 802.11n.

Processor architecture 306 may be implemented or realized in the manner described above for processor architecture 206 (see FIG. 2). In practice, processor architecture 306 includes processing logic that is configured to carry out the functions, techniques, and processing tasks associated with the operation of mobile client device 300. In particular, the processing logic is configured to support the pre-authentication techniques described herein.

Furthermore, the steps of a method or algorithm described in connection with the embodiments disclosed herein may be embodied directly in hardware, in firmware, in a software module executed by processor architecture 306, or in any practical combination thereof. A software module may reside in memory 308, which may be realized as RAM memory, flash memory, ROM memory, EPROM memory, EEPROM memory, registers, a hard disk, a removable disk, a CD-ROM, or any other form of storage medium known in the art. In this regard, memory 308 can be coupled to processor architecture 306 such that processor architecture 306 can read information from, and write information to, memory 308. In the alternative, memory 308 may be integral to processor architecture 306. As an example, processor architecture 306 and memory 308 may reside in an ASIC.

Figure 4:
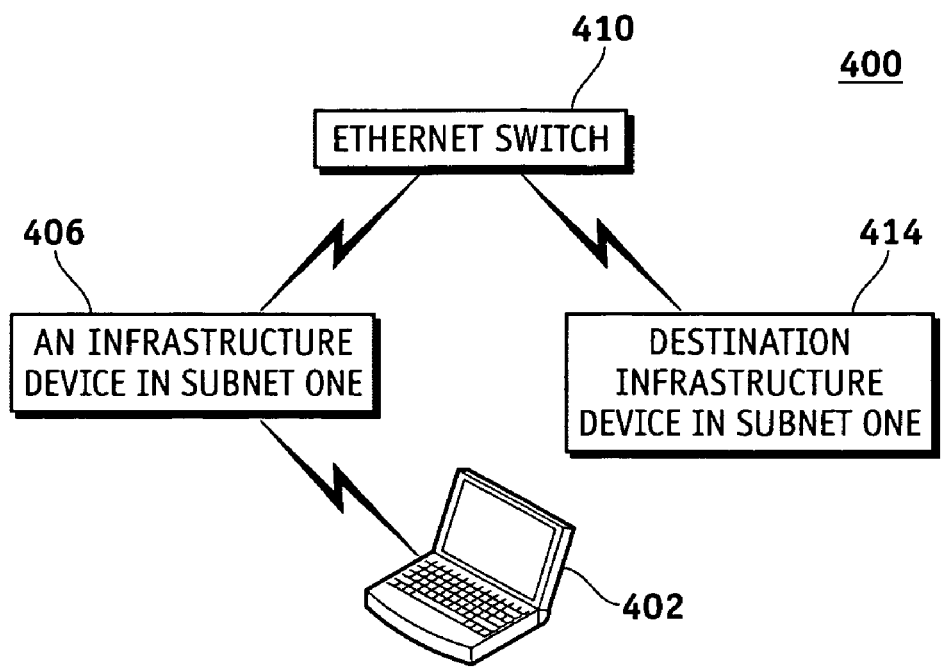
FIG. 4 is a schematic representation of WLAN that illustrates pre-authentication in an Ethernet network having a common Ethernet subnet.

FIG. 4 is a schematic representation of a WLAN illustrating pre-authentication in an Ethernet network having a common Ethernet subnet. FIG. 4 depicts an example communication session that may be carried out by components in the network shown in FIG. 1. In this simplified example, two infrastructure devices 406/414 are depicted, along with a mobile client device 402. This simplified arrangement facilitates the following description of the example communication session, and is not intended to limit the scope or application of the invention in any way. This simplified WLAN environment 400 includes an infrastructure device 406 connected in a common WLAN infrastructure, where the infrastructure device can communicate with a destination infrastructure device 414, through an Ethernet switch 410, in the common Ethernet subnet. FIG. 4 indicates this common Ethernet subnet as "Subnet One." At the time depicted in FIG. 4, a mobile client device 402 is in association with the infrastructure device 406.

The IEEE 802.11i specification is concerned with network security and includes a few pre-authentication techniques as a part of handshake and information exchange. In pre-authentication, before a mobile client device moves to associate with a new infrastructure device, it carries messages for authentication to the new infrastructure device. For example, while the mobile client device 402 is associating with the infrastructure device 406, the infrastructure device 406 may send handshake messages to the destination infrastructure device 414, in response to a pre-authentication request from the mobile client device 402. The handshake messages are sent to prepare for future authentication. By the time the mobile client device 402 is in the network area of the destination infrastructure device 414, the destination infrastructure device 414 is ready to connect to the mobile client device 402 and the mobile client device 402 does not have to go through the authentication process again.

Messages set forth in IEEE 802.11 have at least three addresses. The source address is the medium access control (MAC) address of the mobile client device 402, the second address is the BSSID of the infrastructure device 406 and the destination address is BSSID of the destination infrastructure device 414. Mobile client device 402 will determine the address of the destination infrastructure device 414 by scanning the information sent by infrastructure devices around it. It is possible to pre-authenticate a plurality of infrastructure devices and choose one for a destination infrastructure device based on the highest signal strength that is received by the mobile client device 402. Current pre-authentication techniques can only work as long as the infrastructure devices are in the same layer 2 Ethernet network. For example, if the infrastructure device 406 is in a different subnet than the infrastructure device 414, the pre-authentication does not work because the handshaking message would not operate outside the Ethernet domain boundary. The pre-authentication frame does not cross the VLAN or the subnet boundary, and the frame will drop out or timeout as described in the context of FIG. 5 below. The frame will remain in the timeout or drop out state until it finds an access point that is in the same network domain.

Figure 5:
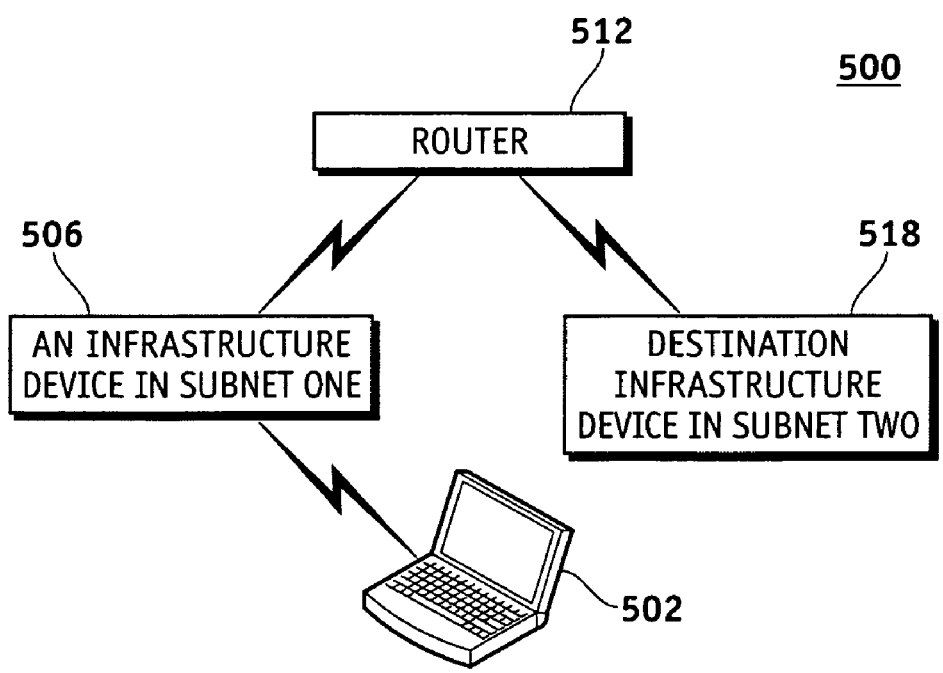
FIG. 5 is a schematic representation of WLAN that illustrates pre-authentication in an Ethernet network having two different Ethernet subnets.

FIG. 5 is a schematic representation of a WLAN. FIG. 5 illustrates pre-authentication in an Ethernet network having two different subnets (subnets are typically used between two sections of the same building), having an infrastructure device 506 connected in the first subnet WLAN infrastructure and initiating communication with a destination infrastructure device 518, via a router 512, connected in the second Ethernet subnet WLAN infrastructure. FIG. 5 also depicts a mobile client device 502 that is currently in association with the infrastructure device 506. WLAN environment 500 depicts an example communication session that may be carried out by components in the network shown in FIG. 1. In this simplified example, two infrastructure devices 506/518 are depicted, along with a mobile client device 502. This simplified arrangement facilitates the following description of the example communication session, and is not intended to limit the scope or application of the invention in any way.

In this example embodiment, mobile client device 502 is in association with the infrastructure device 506 in a first subnet and will determine an Ethernet address of destination infrastructure 518 in a second subnet in order to initiate a request for authentication. In this regard, the mobile client device 502 sends an Ethernet pre-authentication frame, using the Ethernet address of the destination infrastructure device 518, to the infrastructure device 506 in the first subnet. The infrastructure device 506 in the first subnet then attempts to send the Ethernet pre-authentication frame via a router 512 to the destination infrastructure device 518 in the second subnet. However, since the pre-authentication frame would not operate outside the VLAN or the subnet boundaries it will drop out before it reaches the router 512 or it will timeout. The frame will remain in a drop out or timeout state until it finds a destination infrastructure device that is in the same domain/subnet, which would make it possible to resend an Ethernet pre-authentication frame.

In contrast to system 500 above, in an example embodiment of the invention, a mobile client device on a WLAN is able to roam, with a continuous connection, to a destination infrastructure device on a different WLAN with a different VLAN or subnet as described below in context of FIG. 6.

Figure 6:
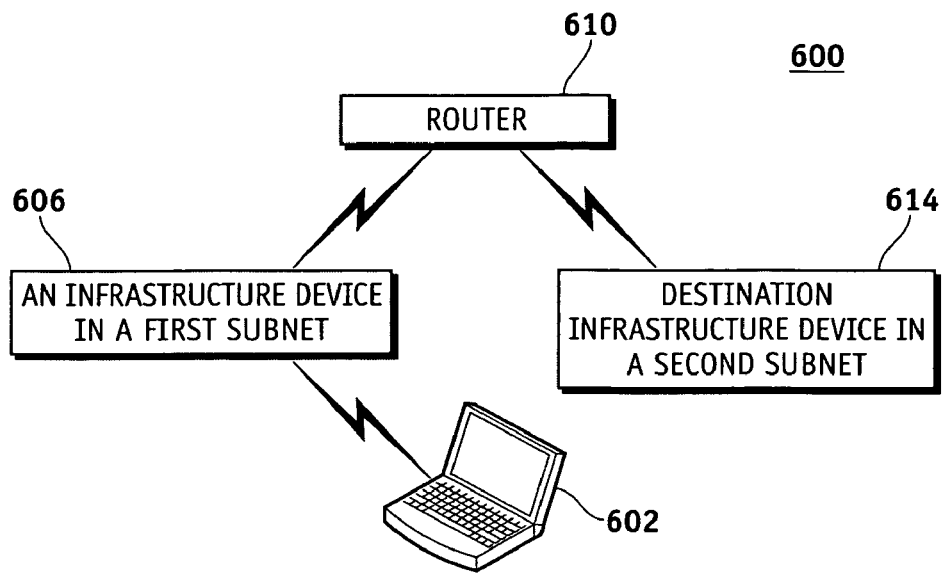
FIG. 6 is a schematic representation of a WLAN that illustrates pre-authentication having two different Ethernet subnets in accordance with an example embodiment of the invention.

FIG. 6 is a schematic representation of a WLAN environment 600. FIG. 6 illustrates pre-authentication with two different Ethernet subnets in accordance with an example embodiment of the invention. In FIG. 6, a mobile client device 602 is pre-authenticated by a destination infrastructure device 614 over the layer 3 IP network via a router 610. For example, the infrastructure device 606 may be on a first subnet and the destination infrastructure device 614 may be on a second subnet. An embodiment of the invention uses a layer 3 protocol (IP) to communicate between the infrastructure devices in different subnets and keep track of the BSSID and the corresponding IP addresses by accessing the network mapping database 210 as explained above. In this example embodiment, the mobile client device 602 is in association with the infrastructure device 606 in a first subnet. The mobile client device 602 determines an Ethernet address of destination infrastructure 614 in the second subnet and initiates a request for authentication. In this regard, the mobile client device 602 sends an Ethernet pre-authentication frame having an Ethernet address corresponding to the destination infrastructure device 614 in the wireless network. The infrastructure device 606 then determines an IP address that is mapped to the Ethernet address of the destination infrastructure device 614 using the network mapping database 210, and encapsulates the Ethernet pre-authentication frame inside an IP packet having the IP address of the destination infrastructure device 614. The complete pre-authentication frame is encapsulated inside the IP header by copying the contents from the memory of the radio (where the wireless frame was received) into the memory of the Ethernet driver (which creates the IP frame). For example, the 802.11 frame may be received over the air, processed by the radio, and placed either in its own memory, or in some common memory location on the network. The Ethernet driver or some other application on the network will copy that frame over from the radio memory, add an IP header, and put it in a memory location where the Ethernet driver can pick it up and send it out over the wire. The infrastructure device 606 then sends the IP packet to the destination infrastructure device 614 in the second subnet via the router 610. In this regard, the Ethernet pre-authentication frame crosses the VLAN or the subnet boundaries to another domain. The destination infrastructure 614 will then pre-authenticate the mobile client device 602. Thus according to this example embodiment, the time for pre-authentication may be significantly reduced. Therefore, a mobile client device will experience less delay to roam from one infrastructure device to another as compared to the technique explained in the context of FIG. 5 above.

Figure 7:
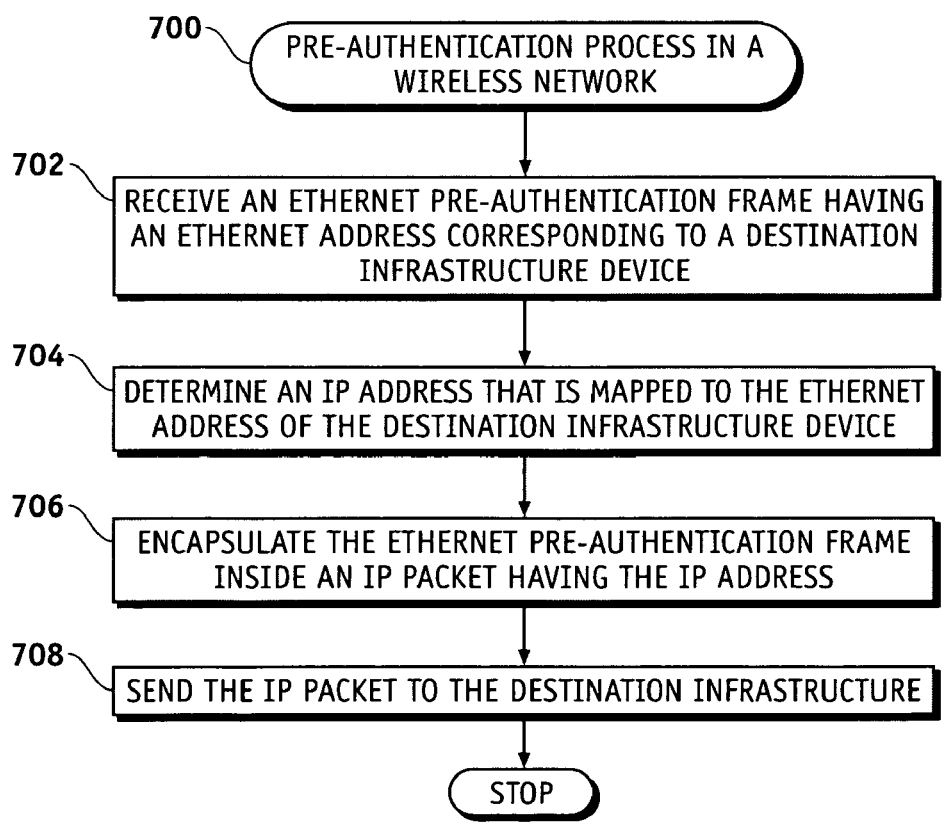
FIG. 7 is a flow chart of a fast-roaming pre-authentication process in a wireless network that may be performed by an infrastructure device configured in accordance with the first example embodiment of the invention.
Figure 8:
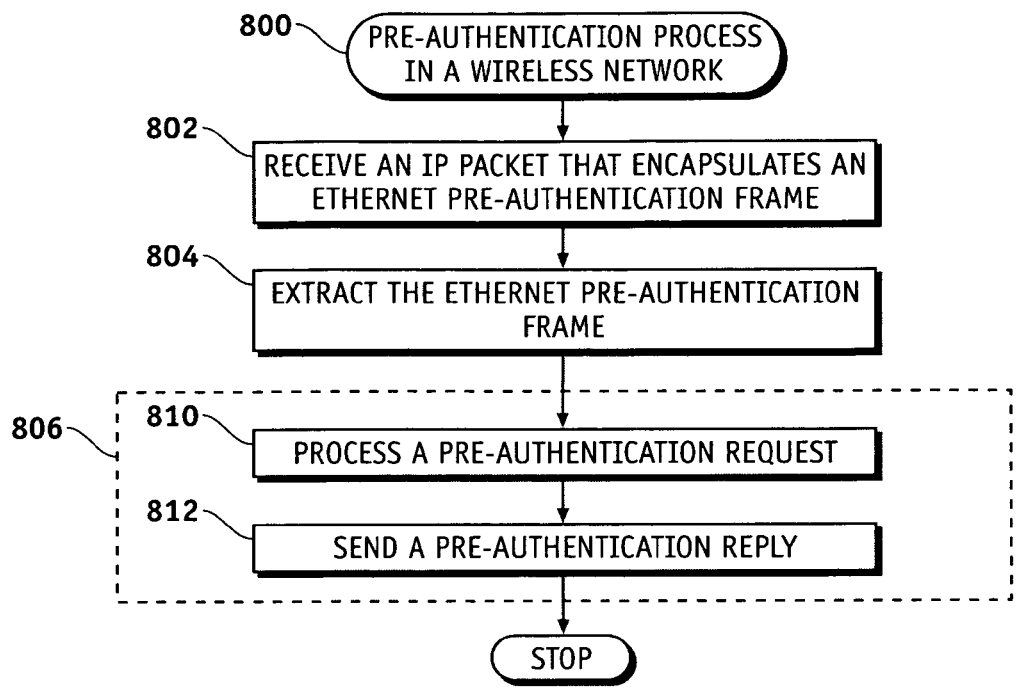
FIG. 8 is a flow chart of a pre-authentication process in a wireless network that may be performed by a destination infrastructure device configured in accordance with the first example embodiment of the invention.
Figure 9:
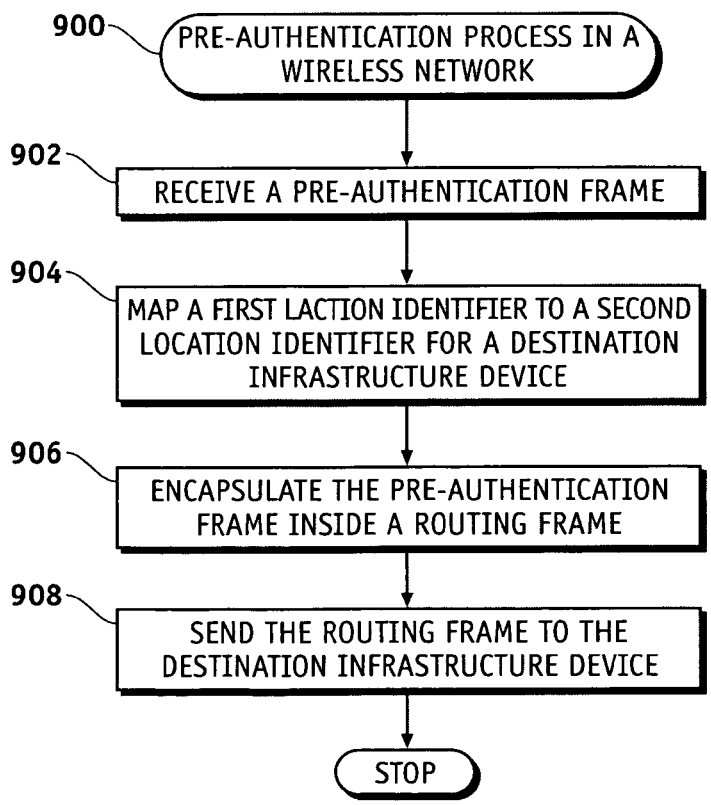
FIG. 9 is a flow chart of a pre-authentication process in a wireless network that may be performed by an infrastructure device configured in accordance with the second example embodiment of the invention.

FIGS. 7-9 are flowcharts of various processes that may be performed in a wireless network. These processes may be carried out in conjunction with the communication session depicted in FIG. 6 and system 200 in FIG. 2. The various tasks performed in connection with any illustrated process may be performed by software, hardware, firmware, or any combination thereof. For illustrative purposes, the following descriptions of these processes may refer to elements mentioned above in connection with FIGS. 1-3. In practical embodiments, portions of a process may be performed by different elements of the described systems. It should be appreciated that a given process may include any number of additional or alternative tasks, the tasks shown in the figures need not be performed in the illustrated order, and any given process may be incorporated into a more comprehensive procedure or process having additional functionality not described in detail herein.

FIG. 7 is a flow chart of a pre-authentication process 700 in a wireless network that may be performed by an infrastructure device configured in accordance with the first example embodiment of the invention. The infrastructure device may be suitable for 802.11 WLAN radios.

The mobile client device determines the Ethernet address of a desired destination infrastructure device by scanning the information sent by the infrastructure devices in the WLAN network area. For example, the mobile client can send a probe request to determine which infrastructure devices are within its wireless transmission range. Infrastructure devices within the range will respond to the probe request with a probe response that contains, for example, capability information such as supported data rates. The mobile client device then selects an infrastructure device for future association and sends a pre-authentication request to the infrastructure device with which it is currently in association. Thus, process 700 may begin with the current infrastructure device receiving, from the mobile client device, an Ethernet pre-authentication frame having an Ethernet address corresponding to a particular destination infrastructure device in the wireless network (task 702). In practice, the Ethernet address may be the BSSID of the destination infrastructure device. In addition to the Ethernet address, the Ethernet pre-authentication frame may include, without limitation, a MAC address of the mobile client device. The currently associated infrastructure device will then proceed to determine an IP address that is mapped to the Ethernet address of the destination infrastructure device (task 704). For example, the infrastructure device may determine the IP address by accessing the network mapping database 210 (as explained above) and examining information or mapping relationships contained in that database. Alternatively or additionally, the IP address may be determined from information sent via the wireless network. For example, the current infrastructure device may receive the IP address and/or mapping information for local resident storage.

To communicate a pre-authentication request across the layer 3 network, the current infrastructure device encapsulates the Ethernet pre-authentication frame inside an IP packet having the IP address (task 706) that was resolved during task 704. In this context, encapsulation of the Ethernet pre-authentication frame is performed by copying a complete Ethernet frame, including source and destination Ethernet addresses, into the IP packet.

In this example embodiment, the IP packet includes, without limitation: the IP address of the intended destination infrastructure device, the BSSID of the destination infrastructure device, and the MAC address of the mobile client device. Eventually, the current infrastructure device sends the IP packet to the destination infrastructure device via the router. The destination infrastructure device will then pre-authenticate the mobile client device as explained in detail below.

FIG. 8 is a flow chart of a pre-authentication process 800 in a wireless network that may be performed by a destination infrastructure device configured in accordance with the first example embodiment of the invention. Process 800 may begin with the destination infrastructure receiving, from the currently associated infrastructure device, an IP packet that encapsulates an Ethernet pre-authentication frame (task 802). Process 800 then extracts the Ethernet pre-authentication frame from the IP packet to obtain the pre-authentication information contained in the frame (task 804). In this regards, the IP packet is picked up by the destination device, and based on some parameters (for example, an IP protocol-type, or a user datagram protocol (UDP) port number) the destination device knows that what is encapsulated inside the IP packet is an 802.11 pre-authentication frame. Process 800 may then proceed to pre-authenticate the mobile client device that originated the Ethernet pre-authentication frame (task 806). In other words, task 806 responds to the original pre-authentication request that was sent to the current infrastructure device. In this regard, the destination infrastructure device processes a pre-authentication request (task 810), which may be based upon the pre-authentication information extracted from the IP packet, and sends a pre-authentication reply, in response to the pre-authentication request, to the requesting mobile client device (task 812). In practice, the pre-authentication request is formatted, processed, and handled in accordance with any suitable technique or protocol, which may be specified in the IEEE 802.11 and 802.11x specifications.

FIG. 9 is a flow chart of a pre-authentication process 900 in a wireless network that may be performed by an infrastructure device configured in accordance with the second example embodiment of the invention. Process 900 begins with the infrastructure device receiving, from a mobile client device in the wireless network, a pre-authentication frame in accordance with a first network communication scheme, the pre-authentication frame including a first location identifier for a destination infrastructure device in the wireless network (task 902). The first network communication scheme may include, without limitation, a communication scheme in compliance with an Ethernet protocol. The first location identifier may be, without limitation, an Ethernet address of the infrastructure device in the wireless network. The infrastructure device then maps the first location identifier to a second location identifier for the destination infrastructure device. The second location identifier may be, without limitation, an IP address of the destination infrastructure device in the wireless network. As mentioned above, the mapping may be performed by accessing a suitably configured network mapping database, and the second location identifier may be determined from information sent wirelessly via the wireless network (for example, sent in a probe response as explained above). As mentioned above in the context of FIG. 2, the network mapping database may be, a local database located in the infrastructure device or it may be a remote database that communicates with the infrastructure device. The network mapping database may be statistically configured by a network administrator or automatically learned as explained in the context of FIG. 2. The infrastructure device then proceeds to encapsulate the pre-authentication frame inside a routing frame that is configured for compliance with a second network communication scheme, the routing frame including the second location identifier for the destination infrastructure device. The second network communication scheme may be, without limitation, an IP compliant communication scheme, and the second location identifier may be, without limitation, an IP address. In addition to the second location identifier, the routing frame may include, without limitation, the BSSID of the destination infrastructure device and the MAC address of the mobile client device. The infrastructure device then sends the routing frame to the destination infrastructure device via a router or any suitable network device, and the destination infrastructure device proceeds to pre-authenticate the mobile client device as explained in the context of FIG. 8 above.

The embodiments of the invention reduce the time for pre-authentication significantly. Thus, a mobile client device will experience less delay to roam from one infrastructure device to another.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method of enhancing roaming of mobile client devices in a wireless network having a plurality of wireless access devices, the method comprising:
   receiving a pre-authentication frame at a first wireless access device of a first Layer 2 subnetwork, the pre-authentication frame originating from a mobile client device that is currently in association with the first wireless access device, the pre-authentication frame including a Layer 2 network address of a second wireless access device of a second Layer 2 subnetwork that is different than the first Layer 2 subnetwork, and the pre-authentication frame further including an identifier of the mobile client device;
   the first wireless access device accessing a network mapping database;
   the first wireless access device using the network mapping database to determine a Layer 3 network address of the second wireless access device, based upon the Layer 2 network address included in the pre-authentication frame;
   the first wireless access device generating a Layer 3 network packet that encapsulates the pre-authentication frame, the Layer 3 network packet also including the Layer 3 network address of the second wireless access device; and
   sending the Layer 3 network packet from the first wireless access device, the Layer 3 network packet being destined for the second wireless access device.

2. The method of claim 1, further comprising storing the pre-authentication frame in a memory of the first wireless access device, wherein generating the Layer 3 network packet comprises copying the pre-authentication frame from the memory of the first wireless access device to the memory of an Ethernet driver of the first wireless access device.

3. The method of claim 1, wherein the network mapping database is remote from the first wireless access device, and wherein accessing the network mapping database comprises wirelessly accessing the network mapping database.

4. The method of claim 1, wherein the network mapping database is located in the first wireless access device, and wherein accessing the network mapping database comprises locally accessing the network mapping database at the first wireless access device.

5. The method of claim 1, further comprising statistically configuring the network mapping database.

6. The method of claim 1, wherein:
   the first Layer 2 subnetwork is a first Ethernet subnetwork;
   the second Layer 2 subnetwork is a second Ethernet subnetwork;
   the Layer 2 network address of the second wireless access device comprises an Ethernet address; and
   the Layer 3 network address of the second wireless access device comprises an IP address.

7. The method of claim 6, wherein the Ethernet address comprises a basic service set identifier (BSSID) of the second wireless access device.

8. The method of claim 1, wherein using the network mapping database comprises mapping the Layer 2 network address to the Layer 3 network address.

9. The method of claim 1, wherein the identifier of the mobile client device comprises a Media Access Control (MAC) address of the mobile client device.

10. A method of enhancing roaming of mobile client devices in a wireless network having a plurality of wireless access devices, wherein a current wireless association is maintained between a mobile client device and a first wireless access device of a first Layer 2 subnetwork, the method comprising:
   receiving a probe at a second wireless access device of a second Layer 2 subnetwork, the probe originating from the mobile client device while it is currently in association with the first wireless access device;
   the second wireless access device sending a probe response to the mobile client device in response to receiving the probe, the probe response including a Layer 2 network address of the second wireless access device;

thereafter, the second wireless access device receiving a Layer 3 network packet from the first wireless access device, the Layer 3 network packet being representative of a pre-authentication request from the mobile client device, the Layer 3 network packet encapsulating a Layer 2 pre-authentication frame that includes the Layer 2 network address of the second wireless access device previously provided by the second wireless access device with the probe response, and that includes and an identifier of the mobile client device, wherein the Layer 2 pre-authentication frame originates from the mobile client device while it is currently in association with the first wireless access device; and pre-authenticating the mobile client device with the second wireless access device, in response to receiving the Layer 3 network packet.

11. The method of claim 10, wherein:

the first Layer 2 subnetwork is a first Ethernet subnetwork;

the second Layer 2 subnetwork is a second Ethernet subnetwork;

the Layer 2 network address of the second wireless access device comprises an Ethernet address; and the Layer 3 network packet includes an IP address of the second wireless access device, the IP address being mapped to the Layer 2 network address of the second wireless access device.

12. The method of claim 11, wherein the Ethernet address comprises a basic service set identifier (BSSID) of the second wireless access device.

13. The method of claim 10, wherein the identifier of the mobile client device comprises a Media Access Control (MAC) address of the mobile client device.

14. The method of claim 10, wherein pre-authenticating the mobile client device comprises:

extracting the Layer 2 pre-authentication frame from the Layer 3 network packet;

processing pre-authentication information associated with the extracted Layer 2 pre-authentication frame; and sending a pre-authentication reply to the mobile client device, while the mobile client device is currently in association with the first wireless access device.

15. A method of enhancing roaming of mobile client devices in a wireless network having a plurality of wireless access devices, the method comprising:

receiving an Ethernet pre-authentication frame at a first wireless access device, the Ethernet pre-authentication frame originating from a mobile client device that is currently in association with the first wireless access device, the Ethernet pre-authentication frame including an Ethernet address of a second wireless access device, and the Ethernet pre-authentication frame further including a Media Access Control (MAC) address of the mobile client device;

the first wireless access device mapping the Ethernet address of the second wireless access device to an IP address of the second wireless access device;

the first wireless access device generating an IP packet that encapsulates the Ethernet pre-authentication frame, the IP packet further comprising the IP address of the second wireless access device;

sending the IP packet from the first wireless access device, wherein the IP address of the second wireless access device indicates a destination of the IP packet;

thereafter, the second wireless access device receiving the IP packet while the mobile client device is currently in association with the first wireless access device;

the second wireless access device extracting the Ethernet pre-authentication frame from the IP packet;

the second wireless access device processing pre-authentication information associated with the extracted Ethernet pre-authentication frame; and the second wireless access device sending a pre-authentication reply that is destined for the mobile client device.

16. The method of claim 15, wherein the Ethernet address of the second wireless access device comprises a basic service set identifier (BSSID) of the second wireless access device.

* * * * *